US 6,666,410 B2

(12) United States Patent
Boelitz et al.

(10) Patent No.: US 6,666,410 B2
(45) Date of Patent: Dec. 23, 2003

(54) LOAD RELIEF SYSTEM FOR A LAUNCH VEHICLE

(75) Inventors: Frederick Wall Boelitz, Medford, MA (US); Leena Singh, Lexington, MA (US); Christopher Michael Gibson, Cambridge, MA (US); Stephen Randolph Smith, Jr., Wayland, MA (US); Piero Miotto, Cambridge, MA (US); Andrew Allen Martin, Hallsville, MO (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 10/266,068

(22) Filed: Oct. 7, 2002

(65) Prior Publication Data

US 2003/0150961 A1 Aug. 14, 2003

Related U.S. Application Data

(60) Provisional application No. 60/327,431, filed on Oct. 5, 2001.

(51) Int. Cl.[7] .............................. G64G 1/00; G06F 19/00
(52) U.S. Cl. ........................ 244/172; 244/3.2; 701/13
(58) Field of Search .................... 244/3.2, 158 R, 244/172; 701/13, 226

(56) References Cited

U.S. PATENT DOCUMENTS

| 3,693,909 A | * | 9/1972 | Hall ............................ 244/3.2 |
| 5,804,812 A | * | 9/1998 | Wicke ......................... 244/3.1 |
| 6,380,526 B1 | * | 4/2002 | Kau ............................. 244/3.2 |

OTHER PUBLICATIONS

Andrew Allen Martin, *Model Predictive Control for Ascent Load Management of a Reusable Launch Vehicle*, Master's Thesis, Dept. of Aeronautics and Astronautics, Massachusetts Institute of Technology, Jun., 2002.

* cited by examiner

Primary Examiner—Robert P. Swiatek
(74) Attorney, Agent, or Firm—Iandiorio & Teska

(57) ABSTRACT

A load relief system for a launch vehicle including a wind sensing system responsive to wind speed and direction at selected locations for providing an output of sensed wind speed and wind direction at the selected locations, a plant model responsive to the sensed wind speed and direction within a finite horizon, a current state of the launch vehicle, and control commands of the launch vehicle to predict the trajectory of the launch vehicle, an error circuit responsive to the predicted trajectory and a reference trajectory to produce a trajectory error, and an optimizer responsive to the trajectory error and configured to provide control commands to compensate for wind load over the finite horizon of the launch vehicle by reducing the total angle of attack.

61 Claims, 10 Drawing Sheets

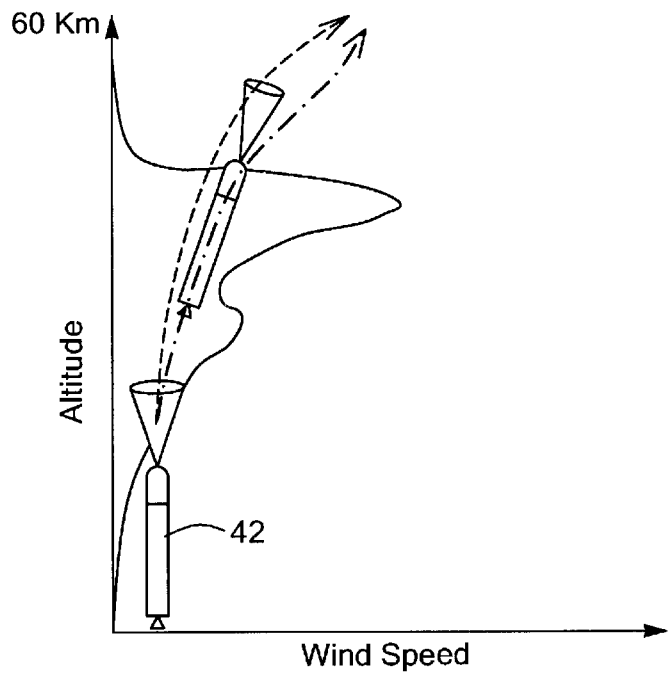
FIG. 7
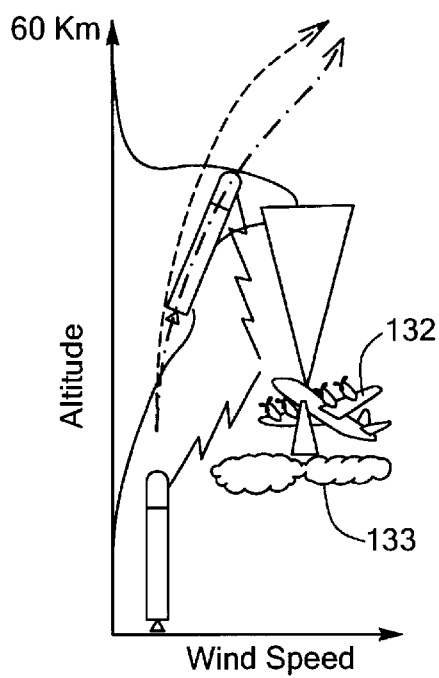 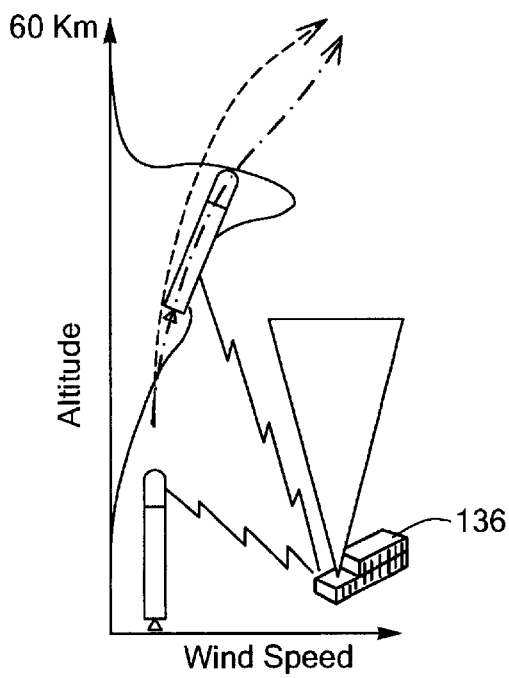
FIG. 8   FIG. 9

LOAD RELIEF SYSTEM FOR A LAUNCH VEHICLE

RELATED APPLICATIONS

This application claims the benefit of U.S. Provisional Application No. 60/327,431 filed Oct. 5, 2001, incorporated by reference herein.

GOVERNMENT RIGHTS

This invention was made with U.S. Government support under Contract No. DAAH01-99-C-R246 and awarded by the Defense Advanced Research Projects Agency (DARPA). The Government may have certain rights in the subject invention.

FIELD OF THE INVENTION

This invention relates generally to a load relief system for a launch vehicle and more particularly to a load relief system for a launch vehicle which measures the winds in near real time and provides control commands that compensate for wind load on the launch vehicle by reducing the total angle of attack.

BACKGROUND OF THE INVENTION

The decision whether to proceed with the launch of vehicles such as rockets, missiles, the Space Shuttle, and the like, is determined in part by the prevailing wind conditions at altitudes up to approximately thirty kilometers above the Earth. Strong winds at altitudes up to approximately 30 kilometers an impart significant bending loads on the launch vehicle during ascent and hence often result in a decision to scrub the launch. Scrubbed launches are expensive and can increase the cost of the launch by as much as five hundred thousand dollars per day.

Conventional systems for reducing the load on a launch vehicle during ascent rely on balloon wind measurement systems, such as jimsphere or rawindsonde balloons, to determine the wind speed and direction at high altitudes. These balloon systems are generally released every hour up to six hours before the scheduled liftoff, and drift with the prevailing wind. The movement or drift of the balloon is generally measured with a ground based radar tracking system. However, because of the associated wind drift of the balloons, these wind measurement systems do not measure the wind speed and direction along the actual expected flight path of the vehicle. The balloon based systems are also unreliable because of loss of radar tracking and mechanical balloon failure. Moreover, the prior art balloon systems generally require approximately sixty to ninety minutes to reach their peak altitude (e.g., 30 kilometers). These systems also require additional time to post process the radar tracking data to estimate and determine the wind profile for launch. Once the wind profile has been determined, it is typically stored and used during the flight of the launch vehicle by an on-board flight processor to reduce the effects of those measured winds during ascent. However, because wind speed and direction are constantly changing, the actual winds experienced by the launch vehicle during flight can be significantly different from those measured prior to flight.

Present systems for reducing the load on a launch vehicle use the previously determined wind profile (e.g., 60 to 90 minutes old at the time of launch of the vehicle) in a largely reactive traditional feedback guidance and control system. Typical guidance and control systems modulate the attitude of the vehicle to provide load relief during the launch vehicle ascent. These guidance and control systems generally employ polynomial curve fits of the measured wind profile and utilize traditional control loops with additional load relief compensation to reduce the loads on the launch vehicle. However, polynomial curve fits of the wind profile tend to average or filter out the effects of rapidly changing winds such as wind shears. Moreover, the prior art load relief systems tend to be reactive in nature. In this regard, during vehicle ascent, an on-board inertial measurement unit (IMU) requires time to detect any actual and/or uncompensated wind shear. Due to this time delay, the majority of the load due to the wind shear has already been transferred to the launch vehicle.

SUMMARY OF THE INVENTION

It is therefore an object of this invention to provide an improved load relief system for a launch vehicle.

It is a further object of this invention to provide such a load relief system in which the wind sensor senses the wind speed and direction approximately every three minutes at altitudes up to approximately thirty kilometers above the Earth.

It is a further object of this invention to provide such a load relief system in which the wind sensor senses the wind speed and direction in the range of about every one minute to about every fifteen minutes at altitudes up to approximately thirty kilometers above the Earth.

It is a further object of this invention to provide such a load relief system in which the wind speed and direction provided reflect the actual prevailing wind conditions experienced during the flight of the launch vehicle.

It is a further object of this invention to provide such a load relief system which efficiently reduces aerodynamic loads on the launch vehicle during flight.

It is a further object of this invention to provide such a load relief system which accurately predicts a trajectory path of the launch vehicle which reduces the load experienced by the launch vehicle by comparing the predicted trajectory to a desired trajectory.

It is a further object of this invention to provide such a load relief system which efficiently provides load relief to the launch vehicle when the vehicle is subjected to wind shear.

It is a further object of this invention to provide such a load relief system which efficiently provides control commands which compensate for wind induced loads on the launch vehicle by reducing the total angle of attack of the launch vehicle.

It is a further object of this invention to provide such a load relief system which reduces the number of scrubbed launches.

The invention results from the realization that a truly effective and robust load relief system for a launch vehicle can be achieved by a unique combination of a wind sensing system responsive to atmospheric winds for providing an output of sensed wind speed and direction at selected locations; a plant model responsive to the sensed wind speed and direction within a finite time horizon, the current state of the launch vehicle, and control commands of the launch vehicle to predict the trajectory of the launch vehicle; an error circuit responsive to the predicted trajectory and a reference trajectory to produce a trajectory error, and an optimizer responsive to the trajectory error and configured to provide control commands that compensate for wind loads over the finite horizon of the launch vehicle by reducing the total angle of attack.

This invention features a load relief system for a launch vehicle including a wind sensing system responsive to wind speed and direction at selected locations for providing an output of sensed wind speed and wind direction at the selected locations, a plant model responsive to the sensed wind speed and direction within a finite horizon, a current state of the launch vehicle, and control commands of the launch vehicle to predict the trajectory of the launch vehicle, an error circuit responsive to the predicted trajectory and a reference trajectory to produce a trajectory error, and an optimizer responsive to the trajectory error and configured to provide control commands to compensate for wind load over the finite horizon of the launch vehicle by reducing the total angle of attack.

In a preferred embodiment, the wind sensing system may sense the wind speed and wind direction at altitudes up to approximately 30 kilometers. The wind sensing system may be mounted on the launch vehicle. The wind sensing system may sense the wind speed and wind direction approximately in real-time. The wind sensing system may be located proximate a launch platform of the launch vehicle and may sense wind speed and direction at least approximately every three minutes or in the range of about every one minute to every fifteen minutes. The wind sensing system may be located on an aircraft and may sense wind speed and direction at least approximately every three minutes or in the range of about every one minute to every fifteen minutes. The launch vehicle may be chosen from the group consisting of Delta, Atlas, Arian, Titan, and Space Shuttle. The wind sensing system may include a Doppler Light Detection and Ranging (LIDAR) sensor. The wind sensing system may include a radar system. The LIDAR sensor may emit an eye safe energy beam pulse. The load relief system of this invention may further include a wind correlator, responsive to the wind sensing system and the current state of the launch vehicle for determining a vector of wind speed and wind direction over the finite horizon of the launch vehicle as a function of time. The vehicle state may include a position vector and a velocity vector. The vehicle state may further include an acceleration vector. The wind correlator may determine the vector of wind speed and wind direction over the finite horizon of the launch vehicle as a function of time by propagating the current vehicle state based upon numerical integration of Newtonian equations of motion. The wind correlator may determine the vector of wind speed and wind direction over the finite horizon of the launch vehicle as a function of time by determining the vehicle altitude as a function of time over the finite horizon based upon the propagated state of the launch vehicle. The plant model may predict the trajectory of the launch vehicle over the finite horizon by integrating Newtonian equations of motion. The plant model may be responsive to the sensed wind speed and direction within the finite horizon, the current state of the launch vehicle, and control commands of the launch vehicle, the plant model configured to calculate a future state of the launch vehicle over successive time steps of launch vehicle states using the Newtonian discrete time state space equations in an iterative loop $x(k+1)=A(k)x(k)+B_u(k)u(k)+B_v(k)v(k)$, $x(k)=x(k+1)$, where $A(k)$ is a state transition matrix that describes the free motion of the vehicle and includes coefficients which define the effects of aerodynamic forces on the launch vehicle including the physical quantities of the launch vehicle, $B_u(k)$ is a matrix indicating the relation of control system variables, $u(k)$, which effect a propagated state of the vehicle, $B_v(k)$ is a matrix indicating the relation of wind effect to the propagated state of the vehicle, $v(k)$ is the measurable disturbance, and $x(k)$ is the vehicle state including the attitude and attitude rate of the vehicle and a velocity vector component of the body of the vehicle. The plant model may be configured to calculate the future trajectory of the launch vehicle physical quantities over the finite horizon based upon the sensed wind speed and direction and the calculated future state of launch vehicle using a Newtonian discrete time output state space equation $y(k)=C(k)x(k)+D_v(k)v(k)$ where $C(k)$ is an output matrix which relates how the current state of the vehicle, $x(k)$, is the current and future predicted state of the launch vehicle, $D_v(k)$ is a matrix which indicates how the sensed wind speed from the wind correlator and other measurable disturbances are related to the output of the plant model, and $y(k)$ is an output that forms the input to error circuit and may further include the total vehicle angle of attack, the position, attitude, and flight path angle of the vehicle. The physical quantities of the launch vehicle may include at least one lift, drag, gravity, vehicle mass, vehicle moment of inertia, position of center of pressure of the vehicle, position of center of gravity of the launch vehicle, or current trim conditions. The reference trajectory may be a predetermined trajectory of the launch vehicle. The error circuit may be responsive to the predicted trajectory and the predetermined trajectory. The error circuit may be configured to calculate the trajectory error by computing the difference between the predetermined trajectory and the predicted trajectory.

The predetermined trajectory may be stored in a database which is accessed by the error circuit as a function of time, velocity, acceleration, or position. The optimizer may be responsive to the trajectory error, vehicle constraints, a cost function of the vehicle trajectory, and the current state of the vehicle, the optimizer determining the control commands that approximately minimize the cost function. The optimizer may determine the control commands that approximately minimize the cost function by iteratively comparing costs determined by the cost function of the launch vehicle trajectory using a plurality of different candidate control trajectories within the finite horizon that satisfy the vehicle constraints. The cost function may include the total angle of attack derived from the trajectory error and the candidate control trajectories. The optimizer may be responsive to the trajectory error, the vehicle constraints, the cost function of the vehicle trajectory, and the current state of the vehicle. The optimizer may be configured to calculate the control command which approximately minimizes the cost function using the equation $$\bar{u}(k)=-K_{du}^{-1}[-\bar{r}^T W_y S_u + H_v \bar{v} W_y S_u + \bar{x}^T S_x^T W_y S_u]^T \text{ where } K_{du}= K_1^T W_u K_1 + S_u^T W_y S_u,$$

$$K_1 = \begin{bmatrix} I & 0 & \cdots & 0 \\ I & I & \cdots & 0 \\ \vdots & \vdots & \ddots & \vdots \\ I & I & \cdots & I \end{bmatrix},$$

where I is an identity matrix of suitable size for the production horizon, Wu and Wy are cost function matrixes which includes gains for regulating the performance of the load relief system, $$S_u = \begin{bmatrix} CB_u & 0 & 0 & 0 \\ CB_u + CAB_u & CB_u & 0 & 0 \\ \vdots & \vdots & \ddots & 0 \\ \sum_{n=1}^{p-1} CA^h B_u & \sum_{h=1}^{p-2} CA^h B_u & \cdots & CB_u \end{bmatrix},$$

p is an integer that indicated the length of the prediction horizon, t equals p multiplied by dt, wherein t is the length in seconds of the prediction horizon and dt is sampled rate of the control system, $$H_v = \begin{bmatrix} CB_v & D_v & 0 & \cdots & 0 \\ CAB_v & CB_v & D_v & \cdots & 0 \\ \vdots & \vdots & \vdots & \ddots & \vdots \\ CA^{p-1}B_d & CA^{p-2}B_d & CA^{p-3}B_d & \cdots & D_v \end{bmatrix}, \text{ and } S_x = \begin{bmatrix} CA \\ CA^2 \\ \vdots \\ CA^p \end{bmatrix}.$$

The optimizer calculate a finite horizon optimal control sequence based upon optimization variables $\alpha_i$, $u_i$, $\delta u_i$ that provide future vector control commands. The cost function may be $$J_i = \sum_{l=i+1}^{i+N} L(\alpha_l, u_l, \delta u_l W),$$

where J is the cost, N the length of the finite horizon within which the optimizer minimizes cost J, $\alpha_l$, $u_l$, $\delta u_{ile}[i, i+1, \ldots, i+N]$ are the optimization variables, and W is a vector of weights or multipliers that scale the variables $u_l$, $\delta u_l$, $\alpha_l$. The vehicle constraints may define the maximum and minimum allowable value outputs to the physical limits of the vehicle and an actuator of the system. The vehicle constraints may include at least one of the following maximum control surface deflections, maximum vehicle speed, minimum vehicle speed, maximum vehicle acceleration, and minimum vehicle acceleration. The optimizer may be chosen from the group consisting of linear, quadratic optimization problems with linear constraints (LSSOL), linear and nonlinear programming problems (SNOPT), simplex and quasi-Newton algorithms, linear, quadratic programming (QPOPT), linear and nonlinear programs (MINOS), non-convex optimization functions, simplex and quasi-Newton solvers, nonlinear programming based solver with and without constraints (NPSOL), Lmpack software, SPOOLES, and optimal trajectory generation with nonlinear differential dynamics and using NPSOL software. The optimizer may determine the control command which approximately minimizes the cost function using optimization algorithms chosen from the group consisting of steepest descent, gradient descent, conjugate gradient, simplex method, Newton methods including Gauss-Newton, Newton-Raphson, and Fletcher-Powell, Broyden methods, dynamic programming, integer programming, linear programming, nonlinear programming, quadratic programming, linear least squares optimization including Gauss-Newton, Levenberg-Marquardt, and primal-dual family of algorithms. The load relief system of this invention may include a computer system for implementing alone or in combination the wind correlator, the plant model, the error circuit, and the optimizer.

This invention further features a load relief system for a launch vehicle including a wind sensing system responsive to wind speed and direction at selected locations for providing an output of sensed wind speed and wind direction at the selected locations, a plant model responsive to the sensed wind speed and direction within a finite horizon, a current state of the launch vehicle, and control commands of the launch vehicle to predict the future trajectory of the launch vehicle by integrating equations of motion, an error circuit responsive to the predicted trajectory and a reference trajectory to produce a trajectory error, and an optimizer responsive to the trajectory error, vehicle constraints, a cost function, and the current state of the launch vehicle, the optimizer configured to provide control commands to compensate for wind load over the finite horizon of the launch vehicle by determining the control commands that approximately minimize the cost function.

This invention further features a method for providing load relief to a launch vehicle, the method including sensing the wind speed and direction at selected locations, predicting the trajectory of the launch vehicle with a plant model responsive to the sensed wind speed and direction within a finite horizon, a current state of the launched vehicle, and control commands of the launch vehicle, determining a trajectory error by comparing a reference trajectory to the predicted trajectory, and generating from the trajectory error, control commands to compensate for wind load at the finite horizon of the launch vehicle by reducing the total angle of attack.

In a preferred embodiment, the wind sensing system may be directed from the launch vehicle. The wind sensing system may be directed from a launch platform proximate the launch vehicle. The wind sensor may be directed from an aircraft.

BRIEF DESCRIPTION OF THE DRAWINGS

Other objects, features and advantages will occur to those skilled in the art from the following description of a preferred embodiment and the accompanying drawings, in which:

FIG. 7 is a schematic three-dimensional view showing one example of the placement of the wind sensor of this invention;

FIG. 8 is a schematic three-dimensional view showing another example of the placement of the wind sensor of this invention;

FIG. 9 is a schematic three-dimensional view showing yet another example of the placement of the wind sensor of this invention;

DISCLOSURE OF THE PREFERRED EMBODIMENT

Figure 1:
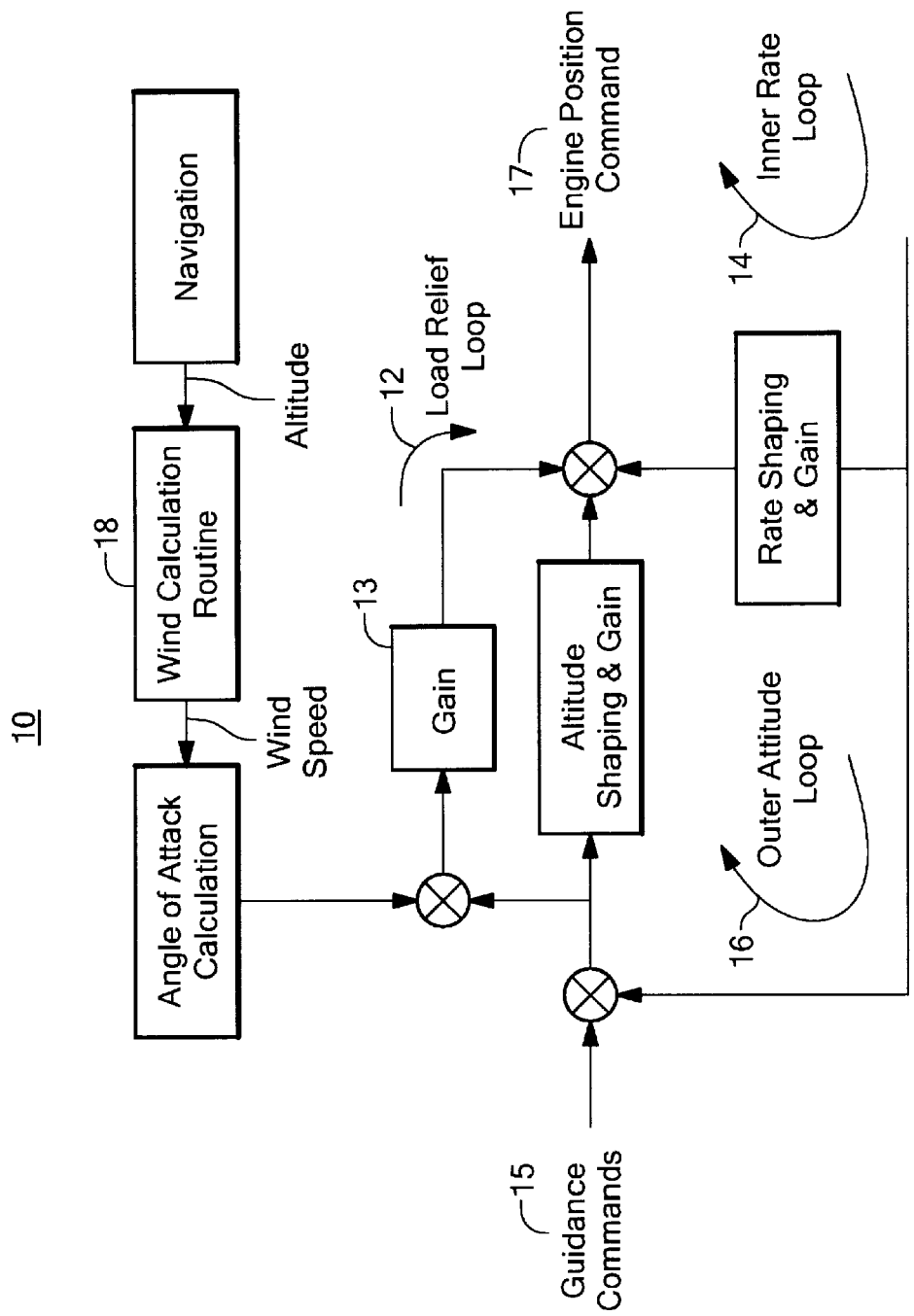
FIG. 1 is a block diagram showing a prior art load relief system for a launch vehicle.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As explained in the Background section above, prior art systems for reducing the load on a launch vehicle rely on balloon measurement systems which provide data which is approximately 60 to 90 minutes old at the time of launch and do not measure the wind speed and direction along the expected flight path of the launch vehicle. Thus, these prior art systems do not incorporate actual wind speed and direction data proximate to the expected flight path of the vehicle.

Figure 2:
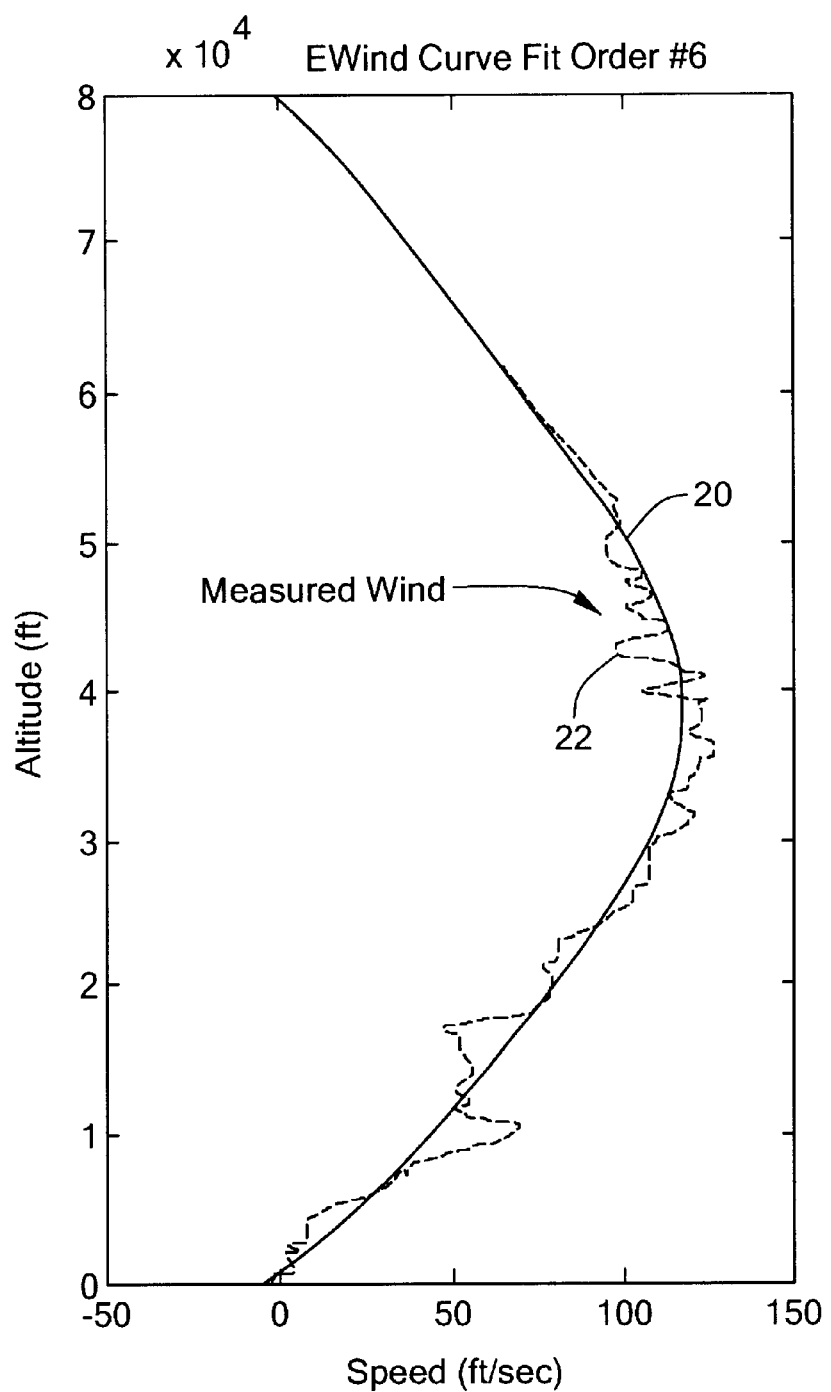
FIG. 2 is a graph showing the polynomial curve fit of a measured wind speed which is utilized by the prior art load relief system of FIG. 1.

Prior art system 10, FIG. 1, integrates the previously measured balloon data to modulate an attitude profile to provide load relief to the launch vehicle during ascent. System 10 utilizes traditional control loops, such as load relief loop 12 to adjust the gain and provide load relief, inner rate loop 14 to provide compensation for rate shaping and gain, and outer attitude loop 16 to compensate for attitude shaping and gain. Prior art system 10 fits a polynomial curve to the previously measured wind speed and direction from the balloon system. For example, polynomial curve fit 20, FIG. 2 is calculated by wind calculation routine 18, from measured wind speed 22. Wind calculation routine 18 employs the average wind profile to compute an average estimate of the current angle of attack due to winds of the launch vehicle. An estimate of the angle of attack is then employed by load relief loop 12 to modify the engine position command 17. The engine position command is the sum of outer attitude loop 16, inner rate loop 14, and load relief loop 12. Load relief loop 12 is activated by modulating gain 13. Using this technique, load relief loop 12 may be activated, deactivated or modulated to adjust the load relief on the launch vehicle. When load relief loop 12 is deactivated by setting the gain 13 to zero, the design of prior art system 10 is to only follow guidance commands 15. However, when gain 13 of the load relief loop 12 is non-zero, the design of prior art system 10 is to also follow the guidance commands 15 while providing some level of load relief through the load relief loop 12. Because of the dual design of prior art system 10, the system provides only indirect control of the launch vehicle loads caused by winds.

As stated in the Background section and above, significant disadvantages of prior art system 10 include old wind speed and direction data, indirect compensation for the wind speed and direction, polynomial curve fits which reduce responses to wind shear, and reactive feedback compensation.

Figure 3:
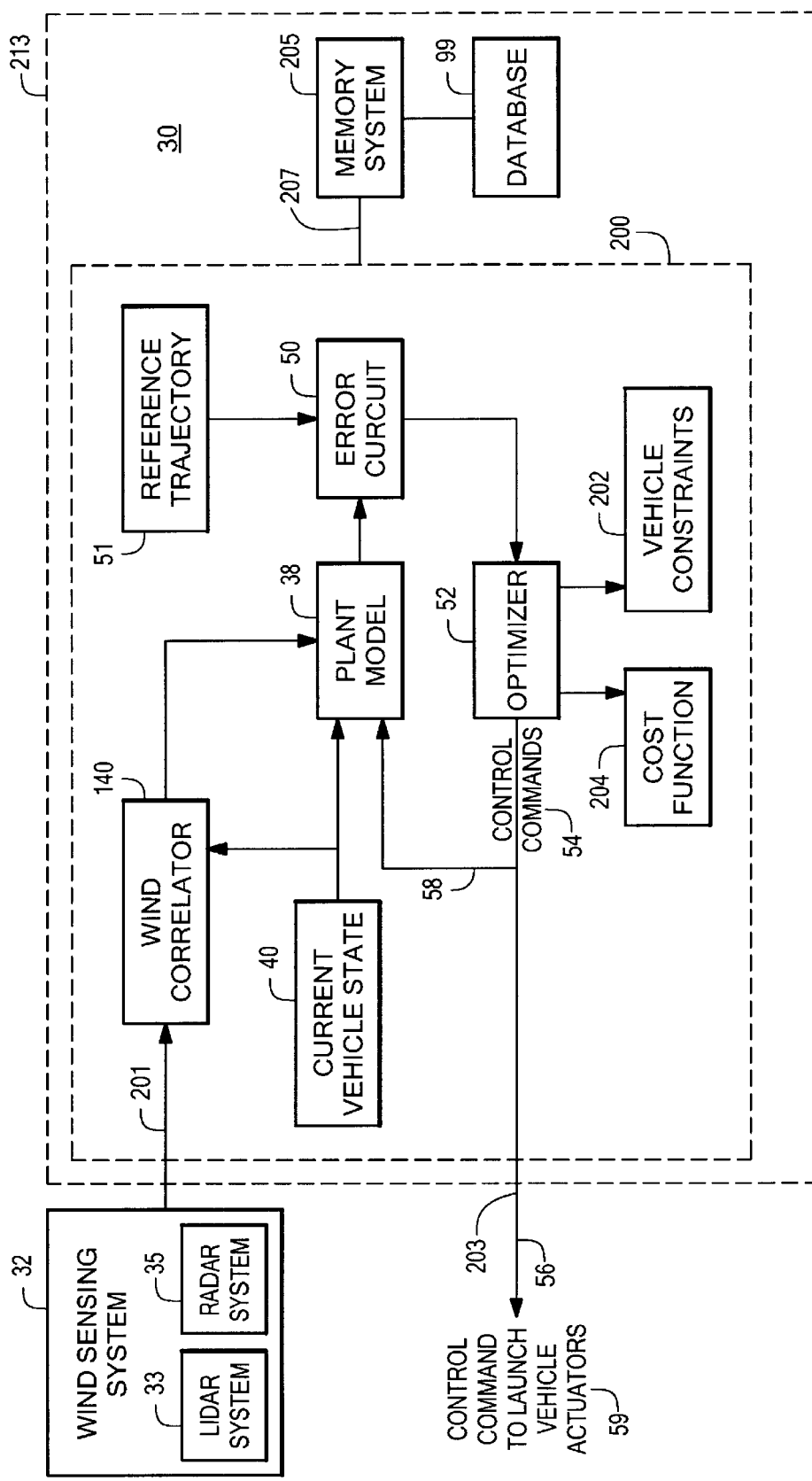
FIG. 3 is a block diagram of the load relief system for a launch vehicle according to one embodiment of the present invention.

In contrast, load relief system 30, FIG. 3, for a launch vehicle, in one embodiment of this invention, includes wind sensing system 32 responsive to wind speed and direction at selected locations and provides an output of the sensed wind speed and direction at the selected locations. For example, wind sensing system 32 may be responsive to the wind speed and direction at a selected location, such as the location indicated by arrow 34, FIG. 4, in the vicinity of reference trajectory 44 or predicted trajectory 48, or at any other selected locations, such as, by way of example only, the locations indicated at 47, 49, 51, 53, or 55 of launch vehicle 42. Those skilled in the art will recognize that any selected location may be employed.

Load relief system 30, FIG. 3, further includes plant model 38 responsive to the sensed wind speed and direction within a finite time horizon, current vehicle state 40 of the launch vehicle, and control commands 54 of the launch vehicle. Plant model 38 predicts the trajectory of the launch vehicle, such as predicted trajectory 48, FIG. 4. The finite horizon is the finite amount of time that corresponds to the duration into the future over which the predicted trajectory and/or future control commands of the launch vehicle are calculated.

Figure 5:
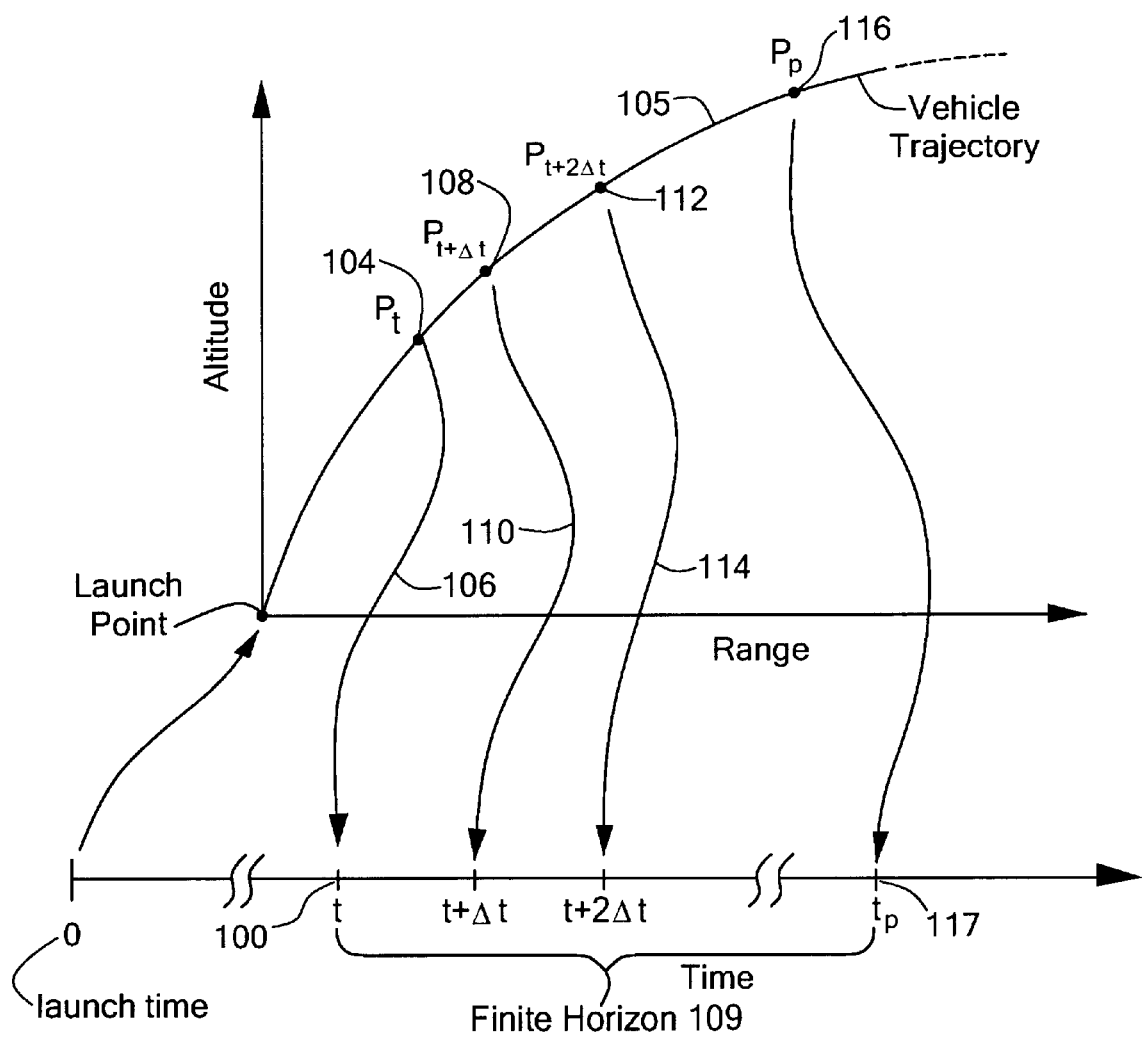
FIG. 5 is a graph showing one example of a finite horizon employed with this invention.

A more detailed explanation of the finite horizon is shown in FIG. 5. The current time t during flight of a launch vehicle is indicated at 100. The finite horizon, e.g., finite horizon 109, is the length of time between current time t indicated at 100 and the time represented by $t_p$, indicated at 117. In this example, $t_p$ is some integer number of $\Delta t$ increments later than time t. The length of the finite horizon may be approximately 1 second to the entire flight time of the vehicle. In this example, the finite horizon has a length of approximately 5 seconds, however, other times lengths, such as 1 or 10 seconds may be appropriate for particular launch vehicles, plant models, or cost functions.

As shown in FIG. 5, the position of the launch vehicle along predicted trajectory 105 at the current time t is shown by $P_t$, indicated at 104 and shown corresponding to current time t by arrow 106. The position of the launch vehicle along the trajectory 105 at time $t+\Delta t$ is shown by $P_{t+\Delta t}$, indicated at 108 and shown corresponding to current time $t+\Delta t$ by arrow 110. The position of the launch vehicle along predicted trajectory 105 at time $t+2\Delta t$ is shown at $P_{t+2\Delta t}$, indicated at 112, and is shown corresponding to current time $t+2\Delta t$ by arrow 114. The position of the launch vehicle at the end of the finite horizon is shown by $P_p$, indicated at 116. The position $P_p$ corresponds to the end point of the finite horizon $t_p$, indicated by 117. The number of increments, $\Delta t$, that collectively form the finite time horizon (e.g., finite horizon 109) is arbitrary but should in general be sufficient in number to accurately characterize the predicted motion of the vehicle so that a reduction in loads is achieved.

Plant model 38, FIG. 3, is responsive to the current vehicle state 40 of the launch vehicle. Current vehicle state 40 of the launch vehicle may include a position vector and/or a velocity vector, and/or an acceleration vector and/or other sensed vehicle data, such as, in one example, the attitude of the launch vehicle, the total angle of attack, and the flight path angle. Plant model 38 is also responsive to the control commands 54 computed by optimizer 52 which reduce the load on the launch vehicle. Control commands 54 are typically computed at regular sampling intervals at real or near real-time from the data provided by wind sensing system 32. Control command 54 modify the position and/or orientation of actuators on the launch vehicle. Typical control commands may include commands to change the angle of the engine nozzle 49, FIG. 4, of launch vehicle 42 which changes the attitude and/or the trajectory of launch vehicle 42. Other control commands may include the positions and/or rates of aerodynamic surfaces, such as rudders, and/or elevators, and/or flaps.

Figure 4:
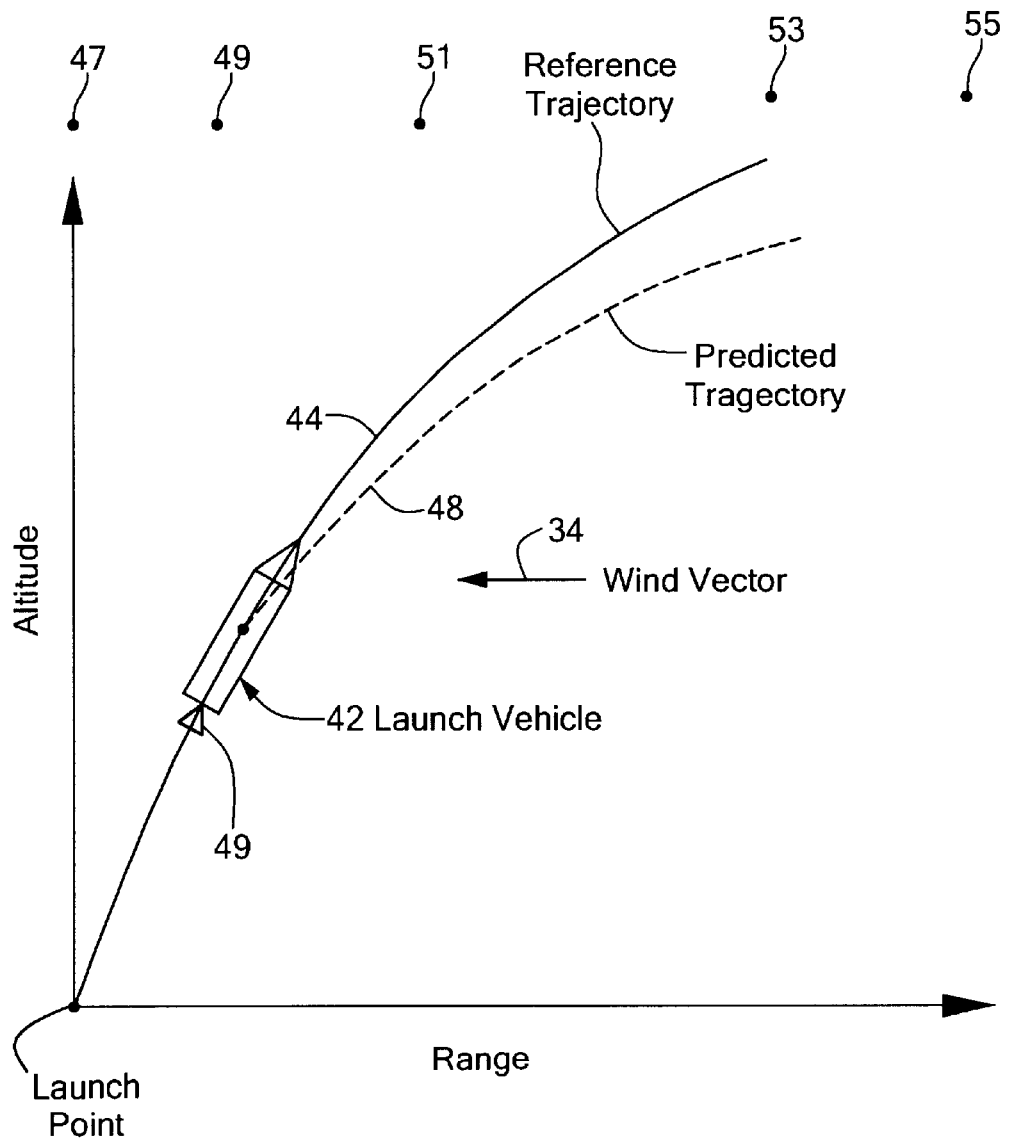
FIG. 4 is a graph of altitude and range showing a reference trajectory and a predicted trajectory of a launch vehicle in accordance with one embodiment of the invention.

Load relief system 30, FIG. 3, further includes error circuit 50, responsive to the predicted trajectory provided by plant model 38, e.g., predicted trajectory 48, FIG. 4, and a reference trajectory, e.g., reference trajectory 44 to produce a trajectory error. The reference trajectory is typically a predetermined trajectory computed prior to launch. In one example, reference trajectory 51, FIG. 3 is based on a desired total angle of attack $\alpha^T$, indicated at 72 in FIG. 6, as will be discussed in detail below. The total angle of attack of the reference trajectory is typically equal to zero degrees. Other possible reference trajectories may be based on factors including the lateral acceleration of the launch vehicle 42 measured along directions z-axis 88 and x-axis 84.

Typically, error circuit 50, FIG. 3, is configured to calculate the trajectory error by computing the difference between the reference trajectory, e.g., reference trajectory 44, FIG. 4, and the predicted trajectory, e.g., predicted trajectory 48, at regular sampling intervals. In one design of this invention, the reference trajectory is stored in memory system 205 as database 99 and is accessed by processor 200 and an algorithm of reference trajectory 51 as a function of time, and/or velocity, and/or acceleration, and/or position to compute the trajectory error.

Load relief system 30 also includes optimizer 52, FIG. 3. Optimizer 52 is responsive to the trajectory error provided by error circuit 50 and provides control commands 54 to compensate for wind load on the launch vehicle. Control commands 54 are communicated to the plant model 38, as indicated by arrow 58. Control commands 54 are a vector of commands in which each command is associated with a single time increment at the current time and/or a future time. Control commands 54 are associated with the current t, indicated at 100, FIG. 5 and each Δt along the finite horizon, as indicated at 109. The control command to launch vehicle engine nozzle 49 may be a subset of the control commands 54 determined by the optimizer 52, or some function thereof. As described above, controlling engine nozzle 49, FIG. 4 may result in a force and/or torque on the body of launch vehicle 42. These forces and torques may reduce the total angle of attack of the launch vehicle 42 and hence reduce the various loads on the vehicle.

Figure 6:
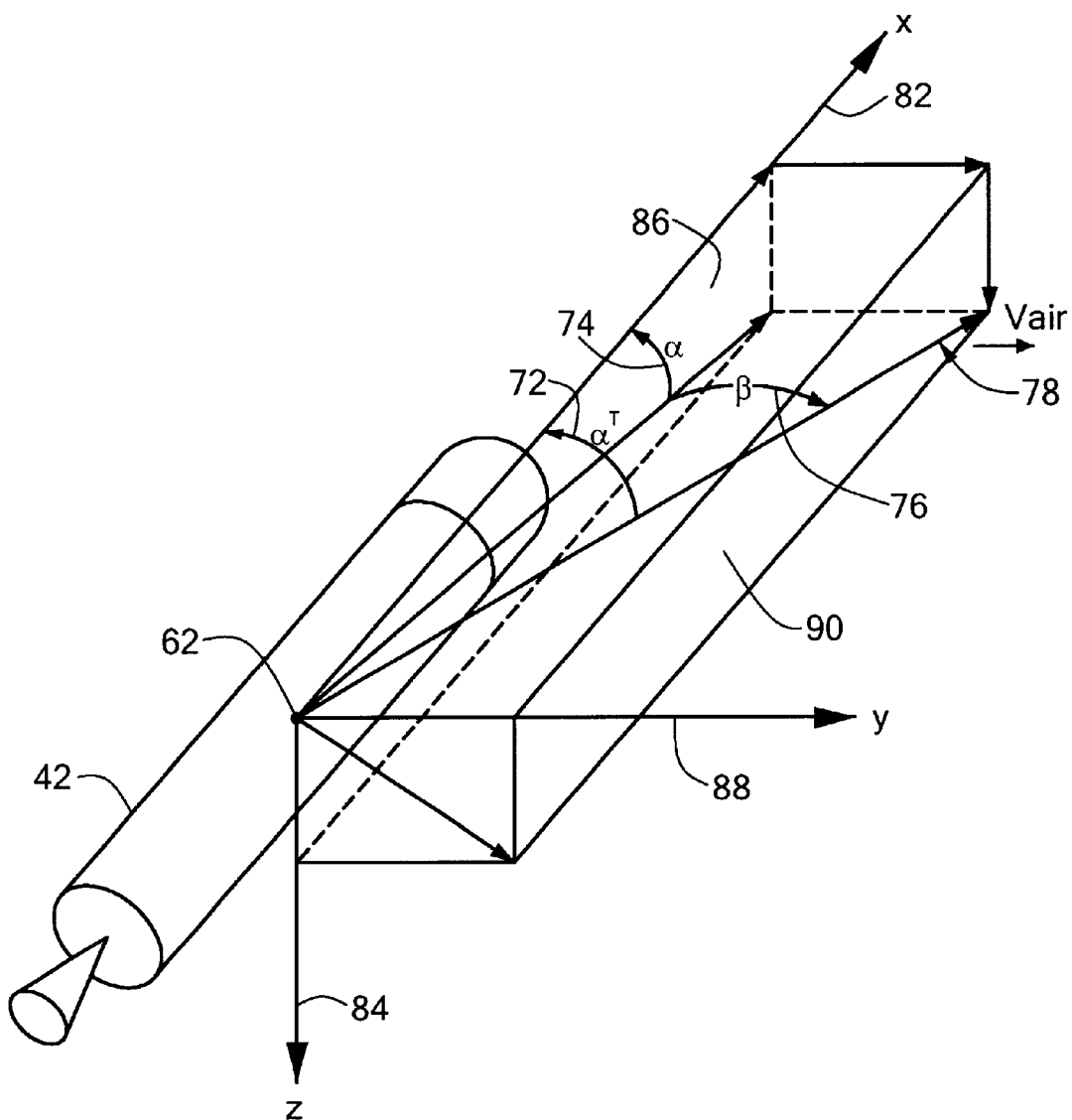
FIG. 6 is a schematic three-dimensional view of a launch vehicle showing the angle of attack, the sideslip angle, the total angle of attack, and the axes of the launch vehicle.

The total angle of attack $\alpha^T$, indicated at 72, FIG. 6, of launch vehicle 42 is measured in a coordinate system originating from the center of gravity 62 of launch vehicle 42, and having x-axis 82, y-axis 88, z-axis 84. The air relative velocity vector 78 is measured within this coordinate frame, and indicates the velocity of the launch vehicle relative to the air mass. The total angle of attack $\alpha^T$, indicated at 72 is a vector sum of the angle of attack α, indicated at 74 of launch vehicle 42 (measured in the x-axis 82, z-axis 84 plane) and the side-slip angle β, indicated at 76 of launch vehicle 42. The total angle of attack $\alpha^T$ is, thus, the measured angle between x-axis 82 and the air relative velocity vector 78.

Optimizer 52, FIG. 3, of load relief system 30 of this invention computes control commands 54 which seek to reduce the output of the trajectory error provided by circuit 50 over the finite horizon. For example, the control commands may reduce the total angle of attack of the launch vehicle. By reducing the total angle of attack of the launch vehicle, the effect of wind speed and direction in the finite horizon are anticipated and the loads on the launch vehicle are reduced. Alternatively, the reference trajectory may be based upon other factors, such as the lateral acceleration and the control commands provided may reduce the lateral acceleration of the launch vehicle. By reducing the lateral acceleration of the launch vehicle the bending loads acting on the vehicle are reduced.

In one embodiment of this invention, wind sensing system 32 senses wind speed and directions at altitudes of up to approximately 30 kilometers at selected locations. In one design of this invention, wind sensing system 32 is mounted on the launch vehicle, such as launch vehicle 42, FIG. 7. Using this design, wind sensing system 32 senses the wind speed and direction of the winds in the direction of the anticipated flight path of the launch vehicle. In other designs, wind sensing system 32 may be fixed rigidly to the launch vehicle or may be pointed to allow wind sensing device 32, FIG. 3, to scan for winds in selected locations.

In another design in accordance with this invention, wind sensing system 32, is mounted on an aircraft, such as aircraft 132, FIG. 8, which may be located above a cloud deck 133. In this design, wind sensing system 32 may sense wind speed and direction unencumbered by cloud deck 133 below. Wind sensors which employ laser energy may be inhibited from measuring the wind speed and direction through clouds. Similar to the vehicle mounted sensing system, the aircraft based sensing system of this invention may be rigidly attached to the structure of the aircraft (e.g., aircraft 132, FIG. 8) or it may be pointed or gimbaled to allow wind sensing system 32, FIG. 3 to detect winds at specific or selected locations (e.g., locations 47, 49, 51, 53, and 55 as shown FIG. 4). Wind sensing system 32 may be affixed to an aircraft or to any other device capable of supporting and lifting wind sensor system 32 above a cloud deck, such as a balloon.

In another example of this invention, wind sensing system 32 is located proximate a launch platform, such as launch platform 136, FIG. 9. A ground based sensor system employing wind sensor 32 of this invention is capable of directing wind sensing system 32 to provide for the detection of winds at selected locations, unlike balloons systems which only measure the speed and direction of winds at the locations where the winds force them to drift.

Other designs of this invention may include combinations of wind sensing systems 32 mounted on aircraft 133, FIG. 8, and wind sensing system 32 located proximate to the launch platform 136, FIG. 9, employed in parallel. This design provides an accurate measurement of wind speed and direction both below and above cloud deck 133, FIG. 8. Other combinations may be made employed in accordance with this invention, including mounting multiple wind sensing systems on multiple aircraft.

Wind sensing system 32 may sense the wind speed and direction periodically or at various times prior to the launch of the launch vehicle and/or during flight. In one embodiment, such as when wind sensing system 32 is mounted on the launch vehicle, wind sensing system 32 may sense wind speed and direction in real-time or near real-time. In other designs, wind sensing system 32 may sense the wind speed and direction in seconds or approximately every three minutes.

The result of wind sensing system 32 providing wind speed and direction data approximately every three minutes is that plant model 38 can accurately predict the trajectory of the launch vehicle based on timely and current wind conditions. In contrast, prior art systems rely on wind speed data which is sixty to ninety minutes old relative to launch time and hence provide less accurate predicted trajectories. Although, as discussed above wind sensing system 32 is disclosed as providing measurement updates at frequencies of near real-time or up to every 3 minutes, those of skill in the art will recognize that other frequencies may be used. For example, frequencies of approximately every 5 minutes, 10 minutes, or 15 minutes may provide adequate accuracy of the prediction of the trajectory of the launch vehicle by the plant model.

Wind sensing system 32, FIG. 3, may include a Doppler Light Detection and Ranging (LIDAR) system 33. LIDAR system 33 preferably emits an eye-safe energy beam pulse which typically has a 2 micron wavelength and is typically applied as a series of high frequency pulses at a rate of approximately 450 nsec. Wind sensing system 32 may also or alternatively include radar system 35. LIDAR system 33 and radar system 35 may be gimbaled to allow for sensing wind speed and direction at selected locations. In one example of this invention, the launch vehicle may be a Delta, Atlas, Ariane, Titan or the Space Shuttle, or any other launch system that may benefit from measurement of winds prior to and/or during flight. It may be possible that the wind measurement data of this invention may be used to provide detailed information about the environment to improve the tracking performance of the launch vehicle, e.g., drift relative to winds.

As shown above, the sensed wind speed and direction data provided by wind sensing system 32 may be stored in a database 99 as a function of altitude. To prepare the wind data for use by plant model 38, load relief system 30 may include a wind correlator 140 to determine the wind speed and direction as a function of time over the finite horizon for the predicted trajectory or altitude at selected time steps over the finite horizon, and preferably at each time step over the finite horizon.

Wind correlator 140 is responsive to the sensed wind speed and direction data of the wind sensing system 32 and the current vehicle state 40 of the launch vehicle. The current state of the vehicle may be provided by an inertial measurement system (IMU) located on the launch vehicle. Although an IMU may be used to provide the current state of the launch vehicle, this is not a necessary limitation of this invention as other systems and methods may be used by those skilled in the art.

Wind correlator 140 predicts the position vector of the vehicle over the finite horizon as a function of time by propagating the current vehicle state. The propagation may be based upon numerical integration of Newton's laws of motion.

In one example of this invention, wind correlator 140 is configured to calculate the future position vector of the vehicle over the finite horizon using the equations $$p(k+1)=p(k)+v(k)dT \qquad (1)$$

and $$p(k)=p(k+1) \qquad (2)$$

in an iterative loop at discrete sampling intervals dT, where p(k) is a current position vector, p(k+1) is a future prediction of the position at dT seconds into the future, and v(k) is the current velocity vector of the vehicle, assumed to be constant over the sampling interval, dT. Although equations (1) and (2) are used to calculate future positions over the finite horizon, equations (1) and (2) are not a necessary limitation of this invention, as other equations can be used by those skilled in the art such as including the vehicle acceleration in the propagation of the vehicle state.

The predicted position vectors of the vehicle over the finite horizon may be used to determine the vehicle altitude at each selected time step over the finite horizon. Once the altitude of the vehicle is known over the finite horizon, the wind correlator maps the altitude of the trajectory at the specified time step with the sensed wind speed and direction as determined by wind sensing system 32. In this manner, the wind speed and direction are now expressed as a function of the finite horizon as opposed to a function of position.

Plant model 38 also predicts the vehicle trajectory, such as predicted trajectory 48, FIG. 4, of the launch vehicle 42 over the finite horizon, such as finite horizon 109, FIG. 5. Similar to wind correlator 140, the predicted trajectory may be calculated by integrating Newtonian equations of motion. Although wind correlator 140, FIG. 3 and plant model 38 are shown as separate modules, each may share a common trajectory propagation model. Typically, the prediction provided by plant model 38 is more accurate than the prediction provided by wind correlator 140 because it is based on a more precise model of forces and torques acting on the launch vehicle.

Plant model 38 may also predict the total angle of attack of the launch vehicle, as well as the attitude of the launch vehicle. Typically. Newton's first and second laws of motion are employed to derive the mathematical representation of the rigid body vehicle dynamics. Those skilled in the art recognize that there are numerous approaches and assumptions that may be made to ensure that the equations of motion adequately capture the predicted motion of the launch vehicle in the trajectory propagation within either or both the wind correlator and the plant model.

In one design of this invention, plant model 38 is responsive to sensed wind speed and direction within the finite horizon provided by wind sensing system 32, current vehicle state 40 of the launch vehicle, typically provided by an IMU, and the control commands, fed back from optimizer 52. Processor 200 is configured to calculate the future state of the launch vehicle over successive time steps of launch vehicle states using discrete time state space equations:

$$x(k+1)=A(k)x(k)+B_u(k)+B_v(k)v(k) \qquad (3)$$

$$x(k)=x(k+1) \qquad (4)$$

where A(k) is a state transition matrix that describes the free motion of the vehicle and that includes coefficients which define the effects of aerodynamic forces on the launch vehicle, e.g., the physical quantities of the launch vehicle, $B_u(k)$ is a matrix indicating the relation of control system variables, u(k), which effect a propagated'state of the vehicle, $B_v(k)$ is a matrix indicating the relation of wind effects to the propagated state of the vehicle, v(k) is the measurable disturbance (e.g. the wind), and x(k) is the vehicle state including the attitude and attitude rate of the vehicle and a velocity vector component of the body of the vehicle. Equations (3) and (4) are computed within an iterative loop to determine the state of the vehicle along each increment of the finite horizon.

Typical coefficients of the launch vehicle include aerodynamic properties of the launch vehicle such as lift and drag; gravity, mass properties of the launch vehicle, such as launch vehicle mass and moments of inertia, position of the center of pressure of the launch vehicle, center of gravity of the launch vehicle, and the current trim conditions for the states of the launch vehicle.

Plant model 38 is configured to calculate the future trajectory (e.g., future points of the trajectory) of the launch vehicle physical quantities based on the sensed wind v(k) and the determined future state x(k) of the launch vehicle at each time step over the finite time horizon using the discrete time output state equation $$y(k)=C(k)x(k)+D_v(k)v(k) \qquad (5)$$

where C(k) is an output matrix which relates how the current state of the vehicle, x(k), is the current and future predicted state of the launch vehicle, $D_v(k)$ is a matrix which indicates how the sensed wind speed from the wind correlator 140 and other measurable disturbances are related to the output of the plant model 38, and y(k) is an output that forms the input to error circuit 50. The output, y(k) may include the total vehicle angle of attack as shown in FIG. 6. Other outputs may include the position, attitude, and flight path angle of the vehicle.

As shown above, error circuit 50 is responsive to the predicted trajectory of the launch vehicle and the reference trajectory. The predicted trajectory of the launch vehicle may be input from either wind correlator 140 or plant model 38. As shown in FIG. 3, the predicted trajectory is input from plant model 38. Error circuit 50 computes the difference between the predicted trajectory and the reference trajectory over the finite time horizon.

Optimizer 52 determines control commands that approximately minimize the cost function. Optimizer 52 determines the optimum control commands by using a multitude of different predicted candidate control trajectories within the finite horizon that may satisfy the vehicle constraints and iteratively determines the associated costs for each predicted candidate trajectory. The computed control commands are computed to reduce the cost and hence the output of the trajectory error circuit 50 over the finite horizon, which in one example may be the total angle of attack. The control commands provided by optimizer 52 may change the angle of the engine nozzle 49, FIG. 4, of launch vehicle 42, which results in a change of the total angle of attack of the launch vehicle, and thereby compensates for the wind load within the finite horizon of the launch vehicle. Additional or alternative control commands may also be provided, such as control command that effect the lateral acceleration of the vehicle.

To calculate the control commands, optimizer 52, FIG. 3, is responsive to the trajectory error provided by error circuit 50, vehicle constraints 202, and cost function 204 and determines control command that approximately minimize the cost function. The vehicle constraints may include the maximum angle and/or angular rate that the engine nozzle 49, FIG. 4, of launch vehicle 42 can change during flight. Vehicle constraints 202 may also or alternatively include the maximum angular position or angular rate that an aerodynamic surface such as a rudder or elevator may move during flight.

The cost function is a mathematical expression that weights the trajectory error from error circuit 50 and control command errors over the finite horizon. For example, control command errors may include the difference between successive control commands and differences as computed from a reference command.

In one example, optimizer 52 is configured to calculate control commands which approximately minimize the cost function using the equation:

$$\bar{u}(k) = -K_{du}^{-1}[-\bar{r}^T W_y S_u + H_v \bar{v} W_y S_u + \bar{x}^T S_x^T W_y S_u]^T \quad (5)$$

where $$K_{du} = K_1^T W_u K_1 + S_u^T W_y S_u, \quad K_1 = \begin{bmatrix} I & 0 & \cdots & 0 \\ I & I & \cdots & 0 \\ \vdots & \vdots & \ddots & \vdots \\ I & I & \cdots & I \end{bmatrix},$$

where I is an identity matrix of suitable size for the prediction horizon, Wu and Wy are cost function matrixes which include gains for regulating the performance of the load relief system, $$S_u = \begin{bmatrix} CB_u & 0 & 0 & 0 \\ CB_u + CAB_u & CB_u & 0 & 0 \\ \vdots & \vdots & \ddots & 0 \\ \sum_{n=1}^{p-1} CA^h B_u & \sum_{h=1}^{p-2} CA^h B_u & \cdots & CB_u \end{bmatrix},$$

p is an integer that indicated the length of the prediction horizon, t equals p multiplied by dt, wherein t is the length in seconds of the prediction horizon and dt is sample rate of the control system, $$H_v = \begin{bmatrix} CB_v & D_v & 0 & \cdots & 0 \\ CAB_v & CB_v & D_v & \cdots & 0 \\ \vdots & \vdots & \vdots & \ddots & \vdots \\ CA^{p-1} B_d & CA^{p-2} B_d & CA^{p-3} B_d & \cdots & D_v \end{bmatrix}, \text{ and } S_x = \begin{bmatrix} CA \\ CA^2 \\ \vdots \\ CA^p \end{bmatrix}$$

Optimizer 52 calculates a vector of future optimal control commands within the finite prediction horizon that minimizes the cost function defined in terms of optimization variables α, u, δu. In one example of this invention, the cost function is defined as:

$$J_i = \sum_{l=i+1}^{i+N} L(\alpha_l, u_l, \delta u_l W), \quad (6)$$

where J is the cost, N the length of the finite horizon within which the optimizer minimizes cost J, $\alpha_l$, $u_l$, $\delta u_{ile}$[i, i+1, ..., i+N] are the optimization variables, W is a vector of weights or multipliers that scale the variables $u_l$, $\delta u_l$, $\alpha_l$. $U_i$ equals [$u_i$, $u_{i+1}$, ..., $u_{i+N}$] and is a vector of control commands defined within the finite optimization horizon and denotes a vector in the output space of the optimizer. If the control vector produced by optimizer 52 is applied to plant model 38, the cost function computed from this control sequence and the predicted trajectory of α states produced by these controls is approximately the minimum feasible cost and hence the loads are the minimum achievable.

Figure 10:
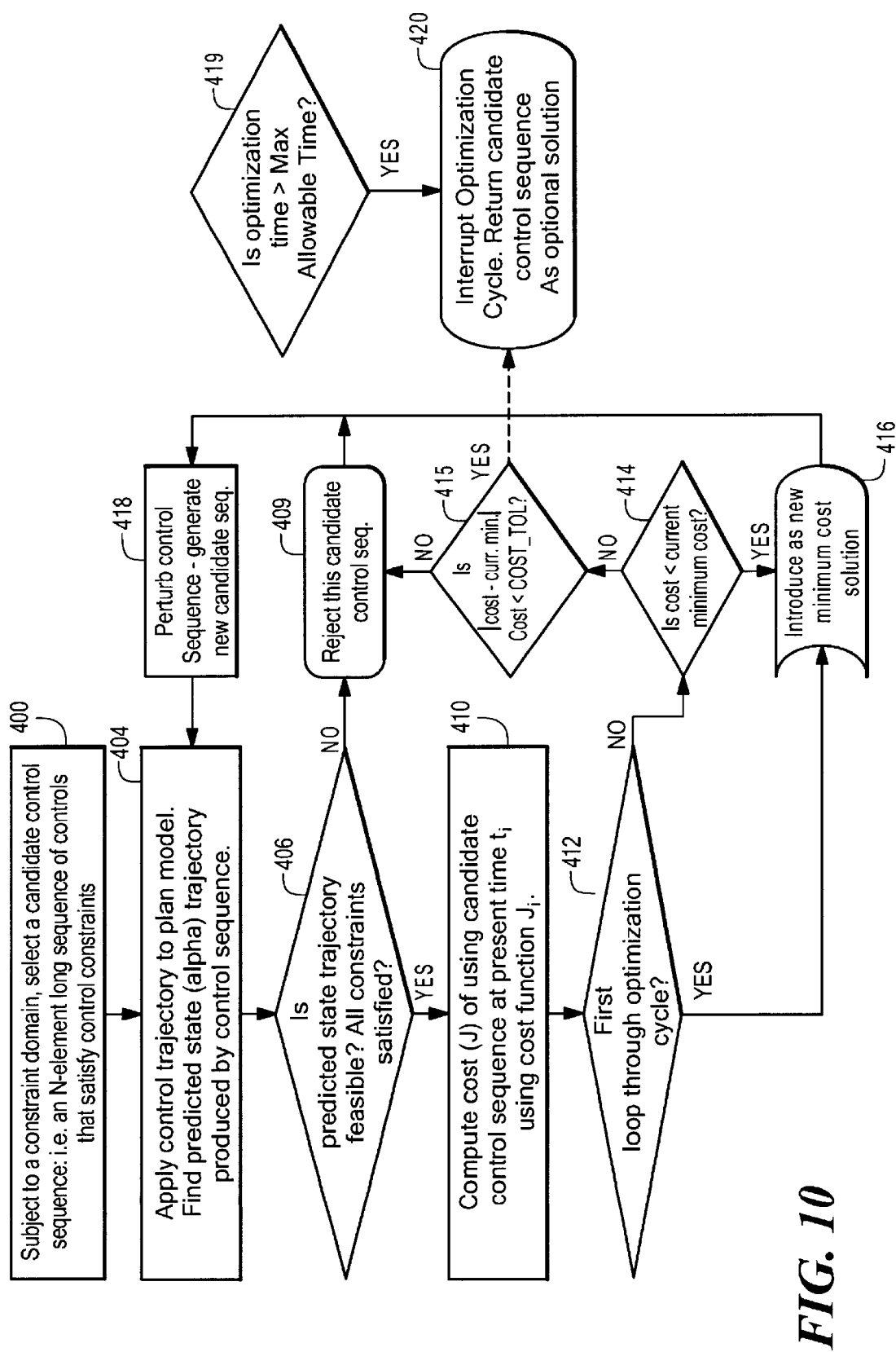
FIG. 10 is a flow chart showing the primary steps the optimizer of the load relief system of one embodiment of the invention employs to calculate commands which approximately minimize the cost function to reduce the total angle of attack of the launch vehicle.

FIG. 10 shows one example of the method optimizer 52, FIG. 3, uses to calculate control commands that approximately minimize the cost function as shown in equation (6). Subject to a constraint domain, the optimizer selects a candidate solution, i.e. an N-element long candidate control vector ($U_i$), step 400, FIG. 10, that satisfies the launch vehicle's control constraints 202, FIG. 3. The initial control selection is typically "seeded" by an initial guess. The optimizer then evaluates this candidate control trajectory $U_i$ by applying it to plant model 38, FIG. 3, and records the resulting state trajectory over the finite horizon, step 404, FIG. 10. The resulting predicted state trajectory is based on solving the mathematical difference equation:

$$\alpha_{i+1} = F(\alpha_i, u_i, v_i) \quad (7)$$

where $u_i$ is the control command applied at time $t_i$, and $w_i$ is a wind disturbance vector at the time $t_i$. The optimizer determines if the resulting predicted output and state trajectories are feasible, i.e., are all state and output constraints satisfied, step 406. If no, the optimizer rejects the current candidate control, step 409. If yes, the optimizer computes the cost of using that control trajectory with present initial conditions, step 410, from the cost function of equation (6) above. The optimizer then compares this cost with any previously computed minimum cost solutions, if they exist, step 414. If this is the first time the optimizer goes through the iteration loop, step 412, then the optimizer labels this result, the minimum cost solution, step 416. If this cost is lower than previously computed costs, it considers this the best solution so far and labels it the running minimum, step 415, otherwise it rejects this candidate. The optimizer then perturbs the previous candidate control trajectory by changing the previous candidate control, step 418, by varying some elements in the previous estimate of the candidate control trajectory to define a new candidate optimal control trajectory. The optimizer repeats the steps 404 through 414 whereby it computes the best trajectory due to the new candidate solution. Steps 404 through 415 are repeated until the optimizer cannot find a control trajectory that produces a significantly lower cost than the current best control trajectory. The term "significantly lower cost" is defined relative to a cost tolerance and is often defined by the user to terminate the search process.

The optimizer then outputs the optimal control trajectory at the time $t_i$, step 420, FIG. 10. This represents the candidate that produced the best, e.g., lowest, cost J of equation (6) above. As a result, the best control trajectory defines control commands that reduce the total angle of attack of the launch vehicle to compensate for wind loads. The optimizer also determines if the optimization time is greater than the maximum allowable time, step 419. If yes, the optimizer interrupts the optimization cycle and returns the candidate control sequence as the optimal solution, step 420.

Typically, the vehicle constraints define the maximum and minimum allowable limits on physical states and actuators (input devices) of the system. In one example, the vehicle constraints include maximum control surface deflections in each possible direction, maximum and minimum vehicle speed, maximum and minimum vehicle accelerations.

In one example of this invention, optimizer 52 is implemented using one of the following methods: linear quadratic optimization for problems with linear constraints (e.g., LSSOL), linear and nonlinear programming problems (e.g., SNOPT), simplex and quasi-Newton algorithms with linear or quadratic programming methods (e.g., QPOPT), linear and nonlinear program methods (e.g., MINOS), non-convex optimization functions, simplex and quasi-Newton solvers, nonlinear programming based solver with and without constraints (e.g., NPSOL), Lmpack (mathematical optimization) software, SPOOLES, and optimal trajectory generation with nonlinear differential dynamic constraints (e.g., NPSOL).

Computer system 213, FIG. 3 implements single processor 200. Other embodiments with multiple processors may also be implemented. For example, plant model 38, error circuit 50, and optimizer 52 may reside on processor 200 or on separate processors. Computer system 213 may include at least one main unit, e.g., processor 200, connected to at least one input device 201 and at least one output device 203. Input device 201 may receive input from an IMU (not shown) or from wind sensing system 32. Output device 203 typically sends control commands 56 to the launch vehicle. The main unit may include processor 200 connected to memory system 205 via an interconnection mechanism 207. Input device 201 and output device 203 are typically connected to processor 200 and may access memory system 205 via interconnection mechanism 207. One or more devices may be connected to computer system 213, such as actuator control processors and/or hardware, such as vehicle engine gimbal controllers, flap and/or rudder controllers, other communication devices (e.g., a MIL-STD 1553 data bus), and storage devices such as a disk or tape or separate processor memory devices (all not shown). Computer system 213 may be a general purpose computer system which is programmable using a computer programming language, such as C, C++, FORTRAN, Ada or other languages, such as a scripting language, or assembly language. Computer system 213 may also be specifically programmed with specific purpose hardware, or an application specific integrated circuit (ASIC). Computer system 213 typically employs processor 200 which may be a commercially available processor, such as a series x86 or Pentium® series processors, available from Intel®, AMD® and Cyrix®, a 680X0 series microprocessor available from Motorola®, a PowerPC microprocessor from IBM®, an Alpha-series processor from the former Digital Equipment Corporation, a MIPS® microprocessor from MIPS Technologies, or any other comparable processors which are available. Processor 200 is typically configured, e.g., programmed, to execute the various calculations of plant model 38, error circuit 50, reference trajectory 51, optimizer 52 and wind correlator 140 shown in equations (1) through (7) above on an operating system, such as IRIX®, UNIX®, Linux®, VMS®, or other real-time operating system (RTOS). The operating system controls the execution of the various calculations as well as executing other computer programs and further provides scheduling, debugging, input/output control, accounting, compilation, storage assignment, data and memory management, and communication control and related services. The processor and operating system define a computer platform for which application programs in high-level programming languages may be written to execute equations (1) through (7) above by the various components of load relief system 30 of this invention. Such a system may be implemented in software, hardware, firmware, or any combination thereof.

The various elements of load relief system 30, e.g., plant model 38, error circuit 50, reference trajectory 51, optimizer 52, wind correlator 140, cost function 204, and vehicle constraints 202, may be implemented either individually or in combination as a computer program for execution by processor 200 or multiple processors. Various steps of the process may be performed by processor 200 by executing a program tangibly embodied on a computer-readable medium to perform functions by operating on input and generating output. Each module or step shown in FIGS. 3, 10, and 12 may correspond to separate modules of a computer program, or may be separate computer programs. Such modules may be operable on separate computers or other devices. The data produced by these components may be stored in memory system 205 or transmitted between computer systems or devices. The plurality of computers or devices may be interconnected by a communication network, such as a MIL-STD 1553 data bus.

Figure 11:
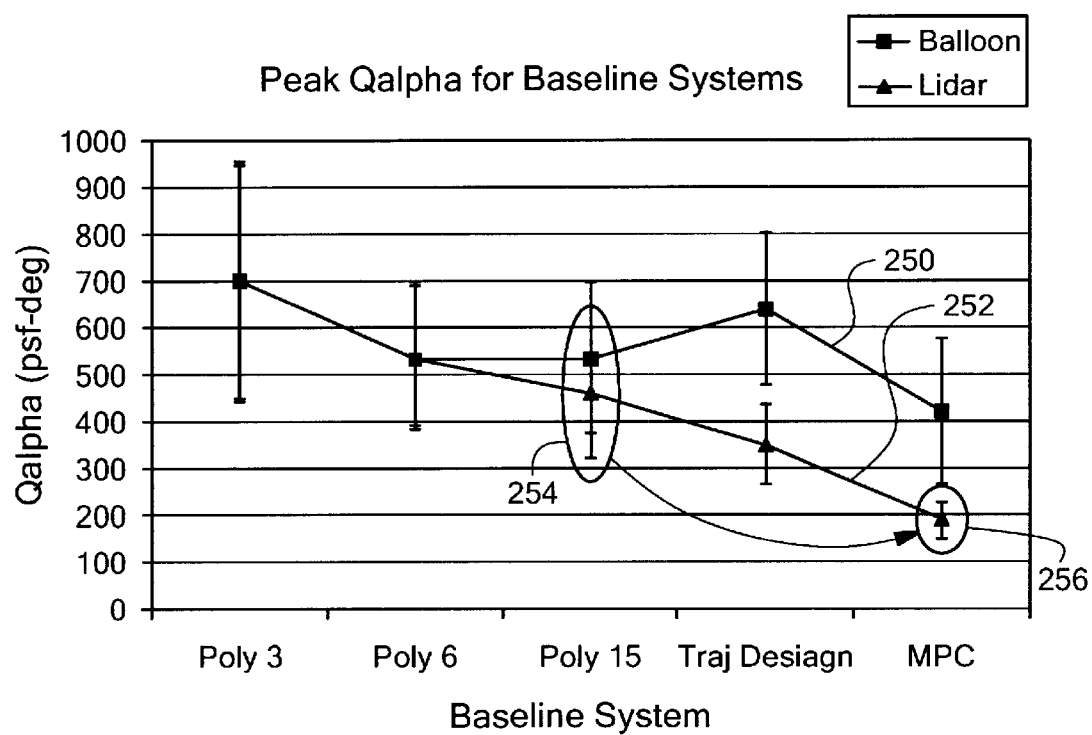
FIG. 11 is a graph showing one example of the load relief achieved in accordance with one embodiment of the invention.

The load relief supplied by the robust load relief system 30 of this invention, in one example, provided a sixty percent reduction in aerodynamic bending load, or Q-alpha, of the launch vehicle. As shown in FIG. 11, prior art system 10 for providing load relief to a launch vehicle, which utilizes unreliable and sixty to ninety minute old data provided by a balloon system, produced a Q-alpha as indicated by graph 250. In sharp contrast, load relief system 30 of this invention produces a Q-alpha as shown by graph 252. As shown by a comparison of graphs 250 and 252, there is a sixty percent reduction in the Q-alpha, or aerodynamic bending load on the launch vehicle in accordance with this invention. Moreover, there is a 70 percent reduction in the standard deviation, as indicated at 254 and at 256. Additionally, load relief system 30 of this invention is not limited to the launch phase of the launch vehicle, as system 30 may be used during landing or in any other atmospheric phase of the launch vehicle flight.

Figure 12:
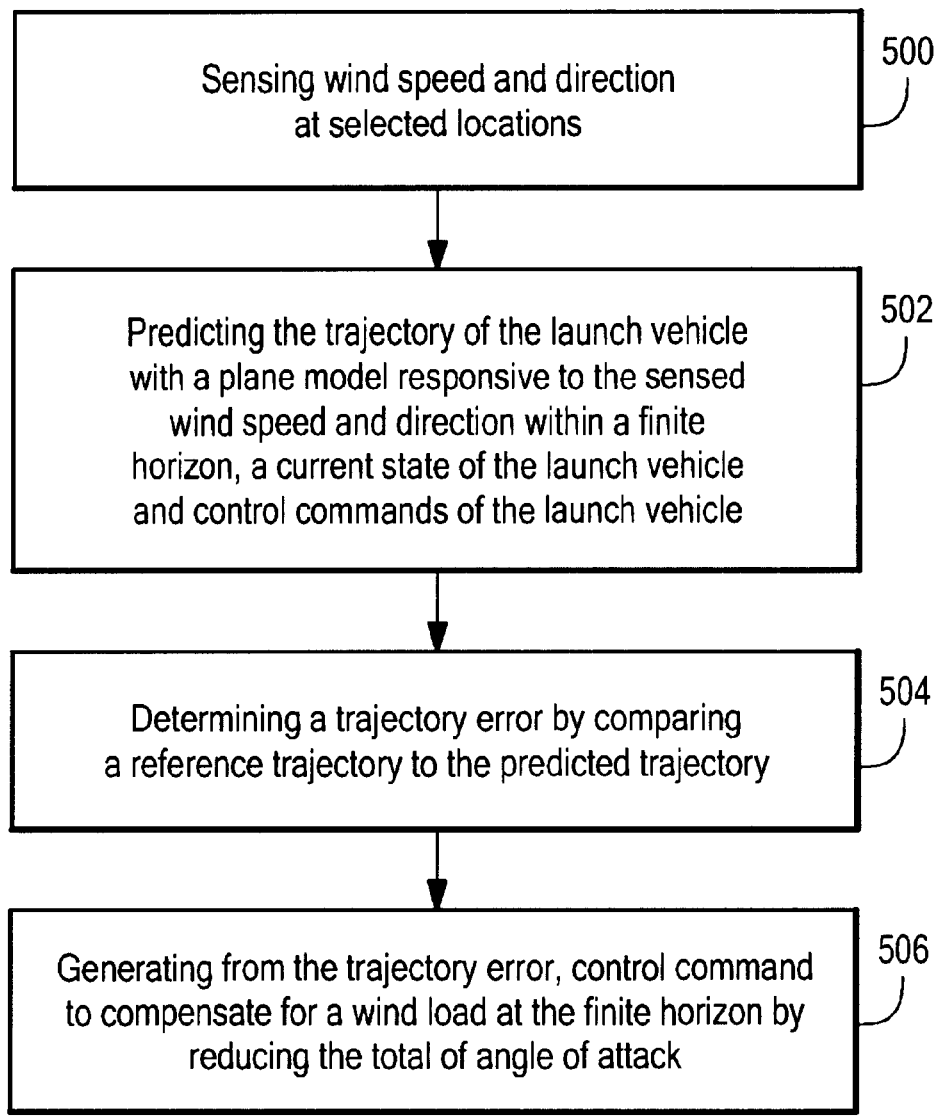
FIG. 12 is a flow chart showing the primary steps of the method for providing load relief to a launch vehicle in accordance with one embodiment of the invention.

The method for providing load relief to a launch vehicle of this invention includes sensing wind speed and direction at selected locations, such as along the predicted flight path of the launch vehicle, step 500, FIG. 12. The method for measuring the winds may be performed repeatedly prior to and during flight with updates to the wind estimates occurring at least approximately every 3 minutes. The method for providing load relief to a launch vehicle of this invention further includes the steps of predicting the trajectory of the launch vehicle with plant model 38, FIG. 3, responsive to the sensed wind speed and direction within the finite horizon and a current state of the launch vehicle, step 502, FIG. 12; determining a trajectory error by matching a reference trajectory to the predicted trajectory, step 504; and generating from the trajectory error, control commands to compensate for the wind load at the finite horizon of the launch vehicle by reducing the total angle of attack, step 506, FIG. 12. The control commands may minimize a cost function to reduce the error between the predicted trajectory and a reference trajectory.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A load relief system for a launch vehicle comprising:
a wind sensing system responsive to wind speed and direction at selected locations for providing an output of sensed wind speed and wind direction at said selected locations;
a plant model responsive to the sensed wind speed and direction within a finite horizon, a current state of the launch vehicle, and control commands of the launch vehicle to predict the trajectory of the launch vehicle;
an error circuit responsive to said predicted trajectory and a reference trajectory to produce a trajectory error; and
an optimizer responsive to said trajectory error and configured to provide control commands to compensate for wind load over the finite horizon of the launch vehicle by reducing the total angle of attack.

2. A load relief system of claim 1 in which said wind sensing system senses said wind speed and wind direction at altitudes up to approximately 30 kilometers.

3. A load relief system of claim 2 in which the wind sensing system is located on an aircraft.

4. A load relief system of claim 3 in which said wind sensing system senses wind speed and direction at least approximately every three minutes.

5. A load relief system of claim 3 in which said wind sensing system senses wind speed and direction in the range of about every one minute to every fifteen minutes.

6. A load relief system of claim 5 in which said LIDAR sensor emits an eye safe energy beam pulse.

7. A load relief system of claim 1 in which said wind sensing system is mounted on the launch vehicle.

8. A load relief system of claim 7 in which said wind sensing system senses said wind speed and wind direction approximately in real-time.

9. A load relief system of claim 1 in which said wind sensing system is located proximate a launch platform of said launch vehicle.

10. A load relief system of claim 9 in which said wind sensing system senses wind speed and direction at least approximately every three minutes.

11. A load relief system of claim 9 in which said wind sensing system senses wind speed and direction in the range of about every one minute to every fifteen minutes.

12. A load relief system of claim 1 in which said launch vehicle is chosen from the group consisting of Delta, Atlas, Arian, Titan, and Space Shuttle.

13. A load relief system of claim 1 in which the wind sensing system includes a Doppler Light Detection and Ranging (LIDAR) sensor.

14. A load relief system of claim 1 in which the wind sensing system includes a radar system.

15. The load relief system of claim 1 further including a wind correlator, responsive to said wind sensing system and said current state of the launch vehicle for determining a vector of wind speed and wind direction over the finite horizon of said launch vehicle as a function of time.

16. The load relief system of claim 15 wherein said wind correlator determines the vector of wind speed and wind direction over said finite horizon of said launch vehicle as a function of time by propagating the current vehicle state based upon numerical integration of Newtonian equations of motion.

17. The load relief system of claim 16 wherein said wind correlator determines the vector of wind speed and wind direction over said finite horizon of said launch vehicle as a function of time by determining the vehicle altitude as a function of time over the finite horizon based upon the propagated state of the launch vehicle.

18. The load relief system of claim 1 wherein said vehicle state includes a position vector and a velocity vector.

19. The load relief system of claim 1 wherein said vehicle state further includes an acceleration vector.

20. The load relief system of claim 1 wherein said plant model predicts said trajectory of the launch vehicle over said finite horizon by integrating Newtonian equations of motion.

21. The load relief system of claim 20 wherein said plant model is responsive to said sensed wind speed and direction within the finite horizon, the current state of the launch vehicle, and control commands of the launch vehicle, the plant model configured to calculate a future state of the launch vehicle over successive time steps of launch vehicle states using the Newtonian discrete time state space equations in an iterative loop:

$$x(k+1) = A(k)x(k) + B_u(k)u(k) + B_v(k)v(k)$$

$$x(k) = x(k+1)$$

where A(k) is a state transition matrix that describes the free motion of the vehicle and includes coefficients which define the effects of aerodynamic forces on the launch vehicle including the physical quantities of the launch vehicle, $B_u(k)$ is a matrix indicating the relation of control system variables, u(k), which effect a propagated state of the vehicle, $B_v(k)$ is a matrix indicating the relation of wind effect to the propagated state of the vehicle, v(k) is the measurable disturbance, and x(k) is the vehicle state including the attitude and attitude rate of the vehicle and a velocity vector component of the body of the vehicle.

22. The load relief system of claim 21 wherein said plant model is configured to calculate said future trajectory of the launch vehicle physical quantities over said finite horizon based upon said sensed wind speed and direction and the calculated future state of launch vehicle using a discrete time state output space equation:

$$y(k)=C(k)x(k)+D_v(k)v(k)$$

where C(k) is an output matrix which relates how the current state of the vehicle, x(k), is the current and future predicted state of the launch vehicle, $D_v(k)$ is a matrix which indicates how the sensed wind speed from the wind correlator and other measurable disturbances are related to the output of the plant model, and y(k) is an output that forms the input to error circuit and may include the total vehicle angle of attack, the position, attitude, and flight path angle of the vehicle.

23. The load relief system of claim 22 wherein said physical quantities of the launch vehicle include at least one of the following: lift, drag, gravity, vehicle mass, vehicle moment of inertia, position of center of pressure of the vehicle, position of center of gravity of the launch vehicle, or current trim conditions.

24. The load relief system of claim 1 wherein said reference trajectory is a predetermined trajectory of said launch vehicle.

25. The load relief system of claim 24 wherein said error circuit is responsive to said predicted trajectory and said predetermined trajectory, the error circuit configured to calculate said trajectory error by computing the difference between said predetermined trajectory and said predicted trajectory.

26. The load relief system of claim 25 wherein said predetermined trajectory is stored in a database which is accessed by said error circuit as a function of time, velocity, acceleration, or position.

27. The load relief system of claim 26 wherein said optimizer is responsive to said trajectory error, vehicle constraints, a cost function of the vehicle trajectory, and said current state of the vehicle, said optimizer determining said control commands that approximately minimize said cost function.

28. The load relief system of claim 27 wherein said optimizer determines said control commands that approximately minimize the cost function by iteratively comparing costs determined by said cost function of said launch vehicle trajectory using a plurality of different candidate control trajectories within said finite horizon that satisfy said vehicle constraints.

29. The load relief system of claim 28 wherein said cost function includes the total angle of attack derived from said trajectory error and said candidate control trajectories.

30. The load relief system of claim 29 wherein said optimizer is responsive to said trajectory error, said vehicle constraints, said cost function of the vehicle trajectory, and said current state of the vehicle, said optimizer configured to calculate said control command which approximately minimizes the cost function using the equation:

$$\bar{u}(k)=-K_{du}^{-1}[-\bar{r}^T W_y S_u + H_v \bar{v} W_y S_u + \bar{x}^T S_x^T W_y S_u]^T$$

where $$K_{du}=K_1^T W_u K_1 + S_u^T W_y S_u,\; K_1 = \begin{bmatrix} I & 0 & \cdots & 0 \\ I & I & \cdots & 0 \\ \vdots & \vdots & \ddots & \vdots \\ I & I & \cdots & I \end{bmatrix},$$

where I is an identity matrix of suitable size for the prediction horizon, Wu and Wy are cost function matrixes which includes gains for regulating the performance of said load relief system, $$S_u = \begin{bmatrix} CB_u & 0 & 0 & 0 \\ CB_u+CAB_u & CB_u & 0 & 0 \\ \vdots & \vdots & \ddots & 0 \\ \sum_{n=1}^{p-1} CA^h B_u & \sum_{h=1}^{p-2} CA^h B_u & \cdots & CB_u \end{bmatrix},$$

p is an integer that indicated the length of the prediction horizon, t equals p multiplied by dt, wherein t is the length in seconds of the prediction horizon and dt is sampled rate of the control system, $$H_v = \begin{bmatrix} CB_v & D_v & 0 & \cdots & 0 \\ CAB_v & CB_v & D_v & \cdots & 0 \\ \vdots & \vdots & \vdots & \ddots & \vdots \\ CA^{p-1}B_d & CA^{p-2}B_d & CA^{p-3}B_d & \cdots & D_v \end{bmatrix}, \text{ and } S_x = \begin{bmatrix} CA \\ CA^2 \\ \vdots \\ CA^p \end{bmatrix}.$$

31. The load relief system of claim 30 wherein said optimizer calculates a finite horizon optimal control sequence based upon optimization variables $\alpha_i$, $u_i$, $\delta u_i$ that provide future vector control commands.

32. The load relief system of claim 31 wherein said cost function is:

$$J_i = \sum_{l=i+1}^{i+N} L(\alpha_l, u_l, \delta u_l W),$$

where J is the cost, N the length of the finite horizon within which the optimizer minimizes cost J, $\alpha_l$, $u_l$, $\delta u_l \in [i, i+1, \ldots, i+N]$ are the optimization variables, and W is a vector of weights or multipliers that scale the variables $u_l$, $\delta u_l$, $\alpha_l$.

33. The load relief system of claim 30 wherein said vehicle constraints define the maximum and minimum allowable value outputs to the physical limits of said vehicle and an actuator of said system.

34. The load relief system of claim 33 wherein said vehicle constraints include at least one of the following: maximum control surface deflections, maximum vehicle speed, minimum vehicle speed, maximum vehicle acceleration, and minimum vehicle acceleration.

35. The load relief system of claim 27 wherein said optimizer is chosen from the group consisting of: linear, quadratic optimization problems with linear constraints (LSSOL), linear and nonlinear programming problems (SNOPT), simplex and quasi-Newton algorithms, linear, quadratic programming (QPOPT), linear and nonlinear programs (MINOS), non-convex optimization functions, simplex and quasi-Newton solvers, nonlinear programming based solver with and without constraints (NPSOL), mathematical optimization, sparse object oriented linear equations solver (SPOOLES), and optimal trajectory generation with nonlinear differential dynamics and using NPSOL software.

36. The load relief system of claim 27 wherein said optimizer determines said control command which approximately minimizes the cost function using optimization algorithms chosen from the group consisting of: steepest descent, gradient descent, conjugate gradient, simplex method, Newton methods including Gauss-Newton, Newton-Raphson, and Fletcher-Powell, Broyden methods, dynamic programming, integer programming, linear programming, nonlinear programming, quadratic programming, linear least squares optimization including Gauss-Newton, Levenberg-Marquardt, and primal-dual family of algorithms.

37. The load relief system of claim 1 further including a computer system for implementing alone or in combination said wind correlator, said plant model, said error circuit, and said optimizer.

38. A load relief system for a launch vehicle comprising:
a wind sensing system responsive to wind speed and direction at selected locations for providing an output of sensed wind speed and wind direction at said selected locations;
a plant model responsive to the sensed wind speed and direction within a finite horizon, a current state of the launch vehicle, and control commands of the launch vehicle to predict the future trajectory of the launch vehicle by integrating equations of motion;
an error circuit responsive to said predicted trajectory and a reference trajectory to produce a trajectory error; and
an optimizer responsive to said trajectory error, vehicle constraints, a cost function, and said current state of said launch vehicle, said optimizer configured to provide control commands to compensate for wind load over the finite horizon of the launch vehicle by determining said control commands that approximately minimize said cost function.

39. A method for providing load relief to a launch vehicle, the method comprising:
sensing the wind speed and direction at selected locations;
predicting the trajectory of the launch vehicle with a plant model responsive to the sensed wind speed and direction within a finite horizon, a current state of the launched vehicle, and control commands of the launch vehicle;
determining a trajectory error by comparing a reference trajectory to said predicted trajectory; and
generating from said trajectory error, control commands to compensate for wind load at the finite horizon of the launch vehicle by reducing the total angle of attack.

40. The method of claim 39 in which said wind speed and direction is sensed at altitudes up to approximately 30 kilometers.

41. The method of claim 39 in which said wind sensing system is directed from the launch vehicle.

42. The method of claim 41 in which said wind speed and direction is sensed in approximately real time.

43. The method of claim 39 in which said wind sensing system is directed from a launch platform proximate said launch vehicle.

44. The method of claim 43 in which said wind speed and direction is sensed at least approximately every three minutes.

45. The method of claim 43 in which said wind speed and direction is sensed in the range of about every one minute to every fifteen minutes.

46. The method of claim 39 in which said wind sensor is directed from an aircraft.

47. The method of claim 46 in which said wind speed and direction is sensed approximately every three minutes.

48. The method of claim 46 in which said wind speed and direction is sensed in the range of about every one minute to every fifteen minutes.

49. The method of claim 39 in which said launch vehicle is chosen from the group consisting of Kistler K-1, Delta, Atlas, Arian, Titan, and Space Shuttle.

50. The method of claim 39 in which said wind sensing system includes a Doppler Light Detection and Ranging (LIDAR) sensor.

51. The method of claim 39 wherein said wherein said plant model predicts said trajectory of the launch vehicle over the finite horizon by integrating Newtonian equations of motion.

52. The method of claim 51 wherein said plant model is responsive to said sensed wind speed and direction within the finite horizon, the current state of the launched vehicle, and control commands of the launch vehicle, said plant model calculating a future state of the launch vehicle over successive time steps of launch vehicle states using the Newtonian discrete time state space equations in an iterative loop:

$$x(k+1)=A(k)x(k)+B_u(k)u(k)+B_v(k)v(k)$$

$$x(k)=x(k+1)$$

where $A(k)$ is a state transition matrix that describes the free motion of the vehicle and includes coefficients which define the effects of aerodynamic forces on the launch vehicle including the physical quantities of the launch vehicle, $B_u(k)$ is a matrix indicating the relation of control system variables, $u(k)$, which effect a propagated state of the vehicle, $B_v(k)$ is a matrix indicating the relation of wind effect to the propagated state of the vehicle, $v(k)$ is the measurable disturbance, and $x(k)$ is the vehicle state including the attitude and attitude rate of the vehicle and a velocity vector component of the body of the vehicle.

53. The method of claim 52 wherein said plant model is configured to calculate said future trajectory of launch vehicle physical quantities over said finite horizon based upon said sensed wind speed and direction and the calculated future state of the launched vehicle using a discrete time state output space equation:

$$y(k)=C(k)x(k)+D_v(k)v(k)$$

where $C(k)$ is an output matrix which relates how the current state of the vehicle, $x(k)$, is the current and future predicted state of the launch vehicle, $D_v(k)$ is a matrix which indicates how the sensed wind speed from the wind correlator and other measurable disturbances are related to the output of the plant model, and $y(k)$ is an output that forms the input to error circuit and may further include the total vehicle angle of attack, the position, attitude, and flight path angle of the vehicle.

54. The method of claim 39 wherein said trajectory error is calculated by computing the difference between a predetermined trajectory and said predicted trajectory.

55. The method of claim 54 further including the step of calculating control commands that approximately minimize a cost function based on said trajectory error, vehicle constraints, a cost function of the vehicle trajectory, and said current state of the vehicle.

56. The method of claim 55 wherein said control commands that approximately minimize the cost function includes iteratively comparing costs determined by said cost function of said launch vehicle trajectory using a plurality of different candidate control trajectories within said finite horizon that satisfy said vehicle constraints.

57. The method of claim 56 in which said cost function includes the total angle of attack derived from said trajectory error and said candidate control trajectories.

58. The method of claim 57 wherein said control commands are calculated using the equation:

$$\bar{u}(k) = -K_{du}^{-1}[-\bar{r}^T W_y S_u + H_v \bar{v} W_y S_u + \bar{x}^T S_x^T W_y S_u]^T$$

where $$K_{du} = K_1^T W_u K_1 + S_u^T W_y S_u, \quad K_1 = \begin{bmatrix} I & 0 & \cdots & 0 \\ I & I & \cdots & 0 \\ \vdots & \vdots & \ddots & \vdots \\ I & I & \cdots & I \end{bmatrix},$$

where I is an identity matrix of suitable size for the prediction horizon, Wu and Wy are cost function matrixes which include gains for regulating the performance of said load relief system, $$S_u = \begin{bmatrix} CB_u & 0 & 0 & 0 \\ CB_u + CAB_u & CB_u & 0 & 0 \\ \vdots & \vdots & \ddots & 0 \\ \sum_{n=1}^{p-1} CA^h B_u & \sum_{h=1}^{p-2} CA^h B_u & \cdots & CB_u \end{bmatrix},$$

p is an integer that indicated the length of the finite horizon, t equals p multiplied by dt, wherein t is the length in seconds of the finite horizon and dt is sampled rate of the control system, $$H_v = \begin{bmatrix} CB_v & D_v & 0 & \cdots & 0 \\ CAB_v & CB_v & D_v & \cdots & 0 \\ \vdots & \vdots & \vdots & \ddots & \vdots \\ CA^{p-1} B_d & CA^{p-2} B_d & CA^{p-3} B_d & \cdots & D_v \end{bmatrix}, \text{ and } S_x = \begin{bmatrix} CA \\ CA^2 \\ \vdots \\ CA^p \end{bmatrix}.$$

59. The method of claim 58 further including the step of calculating a finite horizon optimal control sequence based upon the optimization variables $\alpha_i$, $u_i$, $\delta u_i$ that provide future vector control commands.

60. The method of claim 59 wherein said cost function is:

$$J_i = \sum_{l=i+1}^{i+N} L(\alpha_l, u_l, \delta u_l W),$$

where J is the cost, N the length of the finite horizon within which the optimizer minimizes cost J, $\alpha_l$, $u_l$, $\delta u_{ilc}$[i, i+1, ..., i+N] are the optimization variables, and W is a vector of weights or multipliers that scale the variables $u_l$, $\delta u_l$, $\alpha_l$.

61. The method of claim 39 further including the step of calculating a vector of predicted wind speed and direction over the finite horizon of said launch vehicle as a function of time based on a predicted vehicle launch trajectory from said current state of the launch vehicle.

* * * * *

UNITED STATES PATENT AND TRADEMARK OFFICE
CERTIFICATE OF CORRECTION

| | | |
|---|---|---|
| PATENT NO. | : 6,666,410 B2 | Page 1 of 1 |
| APPLICATION NO. | : 10/266068 | |
| DATED | : December 23, 2003 | |
| INVENTOR(S) | : Boelitz et al. | |

It is certified that error appears in the above-identified patent and that said Letters Patent is hereby corrected as shown below:

In the specification
Col. 1, line 11 through line 15 "This invention was made with U.S. Government support under Contract No. DAAH01-99-C-R246 and awarded by the Defense Advanced Research Projects Agency (DARPA). The Government may have certain rights in the subject invention" should read --This invention was made with government support under DAAH01-99-C-R246 awarded by the Defense Advanced Research Projects Agency (DARPA). The government has certain rights in the invention.--

Signed and Sealed this
Seventeenth Day of May, 2016

Michelle K. Lee
*Director of the United States Patent and Trademark Office*